(12) United States Patent
Moalemi et al.

(10) Patent No.: US 9,324,499 B2
(45) Date of Patent: Apr. 26, 2016

(54) HIGH CAPACITANCE SINGLE LAYER CAPACITOR

(75) Inventors: Ali Moalemi, San Diego, CA (US);
Euan Patrick Armstrong, Pasadena, CA (US)

(73) Assignee: Knowles Capital Formation, Inc., Itasca, IL (US)

( * ) Notice: Subject to any disclaimer, the term of this patent is extended or adjusted under 35 U.S.C. 154(b) by 389 days.

(21) Appl. No.: 13/168,879

(22) Filed: Jun. 24, 2011

(65) Prior Publication Data

US 2012/0327553 A1    Dec. 27, 2012

(51) Int. Cl.
| | |
|---|---|
| *H01G 4/06* | (2006.01) |
| *H01G 4/228* | (2006.01) |
| *H01G 4/38* | (2006.01) |
| *H01G 4/005* | (2006.01) |
| *H01G 4/252* | (2006.01) |
| *H01G 4/232* | (2006.01) |

(52) U.S. Cl.
CPC .............. *H01G 4/252* (2013.01); *H01G 4/228* (2013.01); *H01G 4/232* (2013.01); *Y10T 29/435* (2015.01)

(58) Field of Classification Search
CPC ......... H01G 4/30; H01G 4/232; H01G 4/012; H01G 4/38
USPC ......... 361/321.1, 321.2, 306.2, 748, 328, 303
See application file for complete search history.

(56) References Cited

U.S. PATENT DOCUMENTS

| | | | |
|---|---|---|---|
| 5,825,608 A | 10/1998 | Duva et al. | |
| 6,058,004 A | 5/2000 | Duva et al. | |
| 6,208,501 B1 * | 3/2001 | Ingalls et al. | 361/303 |
| 6,366,443 B1 | 4/2002 | Devoe | |
| 6,542,352 B1 | 4/2003 | Devoe | |
| 6,587,327 B1 | 7/2003 | Devoe | |
| 6,661,639 B1 | 12/2003 | Devoe et al. | |
| 6,690,572 B2 | 2/2004 | Liebowitz | |
| 6,751,082 B2 | 6/2004 | Devoe | |
| 6,753,218 B2 | 6/2004 | Devoe | |
| 6,816,356 B2 | 11/2004 | Devoe | |
| 6,969,647 B2 * | 11/2005 | Devoe et al. | 438/244 |
| 7,136,274 B2 * | 11/2006 | Hwang et al. | 361/306.3 |
| 2002/0101702 A1 * | 8/2002 | Makl, Jr. | H01G 4/30 361/306.3 |
| 2003/0011962 A1 | 1/2003 | Yamamoto | |
| 2004/0207972 A1 * | 10/2004 | Kazama | 361/321.2 |
| 2010/0014213 A1 | 1/2010 | Wozniak et al. | |
| 2012/0327554 A1 * | 12/2012 | Moalemi et al. | 361/321.1 |

OTHER PUBLICATIONS

Singapore Search Report and Written Opinion for Singapore Patent Application No. 201204691-8; issued by the Danish Patent and Trademark Office on Dec. 14, 2012; date of mailing Jan. 11, 2013, 17 pages.

* cited by examiner

*Primary Examiner* — Eric Thomas
*Assistant Examiner* — Arun Ramaswamy
(74) *Attorney, Agent, or Firm* — Burr & Brown, PLLC

(57) ABSTRACT

A high capacitance single layer ceramic capacitor structure having a ceramic dielectric body containing one or more internal electrodes electrically connected to a metallization layer applied to the side and bottom surfaces and a metallization pad electrically isolated from the metallization side and bottom surfaces positioned on a top surface of the ceramic body.

5 Claims, 2 Drawing Sheets

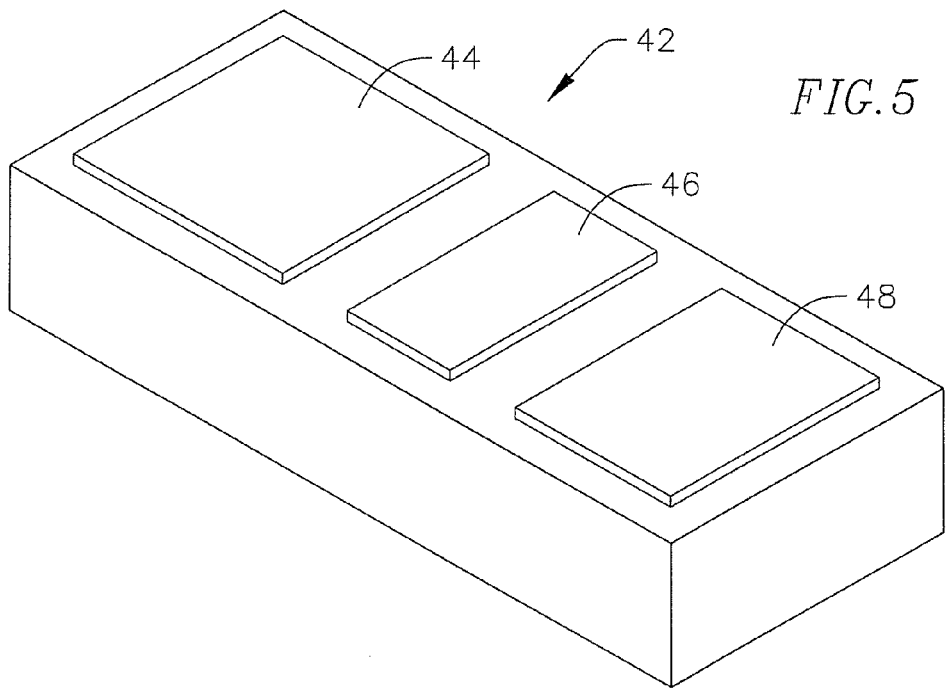
FIG.5
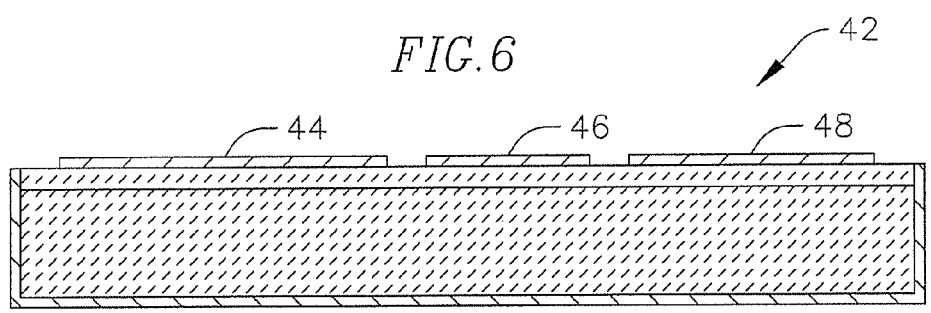
FIG.6
FIG.7
FIG.8
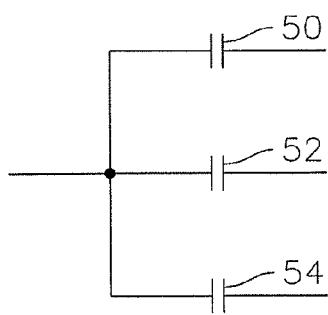
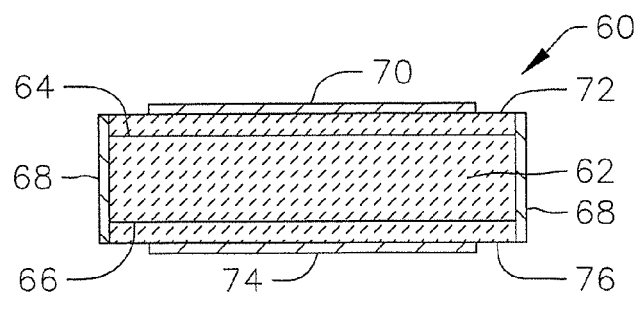

HIGH CAPACITANCE SINGLE LAYER CAPACITOR

BACKGROUND OF THE INVENTION

1. Field of the Invention

This invention relates to single layer capacitors, and more particularly, to high capacitance single layer ceramic capacitors and a method of making the capacitors.

Single layer ceramic capacitors have a useful form factor for assembly into electrical circuits which are present on printed circuit boards or integrated circuits within chip carriers or other packages where space is limited. Dimensions of the ceramic capacitor can be matched with the limitations within the printed circuit board or chip carrier holding the integrated circuit. Typically the bottom surface of a ceramic capacitor is soldered to or connected with conductive epoxy to the surface of the printed circuit board and the top face of the ceramic capacitor presents one or more electrically conductive pads that serve as another circuit connection end point. Typically, single layer ceramic capacitors are produced by metallizing two faces of a thin sheet of sintered ceramic material. The metallized ceramic sheet is then cut to size by sawing or abrasive cutting techniques. While the form factor of these capacitors is desirable, the amount of capacitance that can be achieved limits their usefulness in certain applications, particularly when design considerations require particularly small or particularly thin capacitors. In such circumstances, the capacitor does not have sufficient structural strength to withstand undesirable fracturing or chipping during routine handling during assembly into circuits. Consequently design tradeoffs must be made between using thicker ceramic layers for greater strength and thinner ceramic layers for greater capacitance.

2. Description of Related Art

Prior attempts to achieve higher capacitance in a single layer capacitor while maintaining structural strength include using a flat, horizontal capacitor with metallization on its lower side having a gap. The problem with this design is that it creates unwanted resonances at frequencies above a few gigahertz. Another approach has been to use standing dielectric chips with opposed metallized surfaces and with metal leads attached to the respective surfaces. Problems with this design is that leads are fragile and require extreme care during fabrication, shipping, handling and soldering in place to traces. In addition, standing leaded capacitors produce significant signal resonances, especially for frequencies above a few gigahertz. Further attempts to produce higher capacitance single layer capacitors include multi-layer materials laminated together. These multi-layers include a ceramic dielectric material and a ceramic/metal composite material sheet. A problem with this design is that the manufacturing process includes laminating sheets together and the ceramic/metal composite material is quite expensive. Yet another ceramic capacitor design includes at least one interior metallization plane or plate and a multiplicity of vias performing multiple redundant electrical connections within the capacitor. Such designs are extremely difficult to manufacture to provide for interior metallization planes or plates connected through a multiplicity of vias.

Consequently, a need exists for a high capacitance single layer ceramic capacitor which is inexpensive and easy to manufacture.

SUMMARY OF THE INVENTION

The present invention provides a monolithic single layer capacitor having high capacitance and structural strength which is easily and inexpensively manufactured. The capacitor of the present invention provides for electrical connections to be made on top and bottom opposing surfaces. The capacitor provides for higher capacitance values than with existing designs while still maintaining form factor and high structural strength. The ceramic capacitor includes a continuous metallization applied to one to five surfaces of a ceramic body which makes contact within one or more internal electrodes. One or more further metallization pads are applied to the top surface of the capacitor. Electrical connection to an external circuit are achieved by attaching to the top and bottom surfaces of the capacitor. The capacitor can be manufactured through the use of a green ceramic bar which is built upon with one or more internal electrodes. The bar is cut and individual chips fired. The capacitor is metallized on all sides and the top pad is formed by removal of a portion of the metallization using a laser, mechanical milling or other process to isolate a top conductive pad. Alternatively, a passivation material on the surface of the capacitor can be applied prior to isolate the top conductive pad.

BRIEF DESCRIPTION OF THE DRAWINGS

FIG. 5 is a perspective view of another alternative embodiment single layer capacitor of the present invention;

FIG. 6 is a cross-sectional view of the capacitor of FIG. 5;

FIG. 7 is an electrical schematic of the capacitor of FIG. 5; and

FIG. 8 is a cross-sectional view of another alternative embodiment single layer capacitor of the present invention.

DETAILED DESCRIPTION OF THE INVENTION

Figure 1:
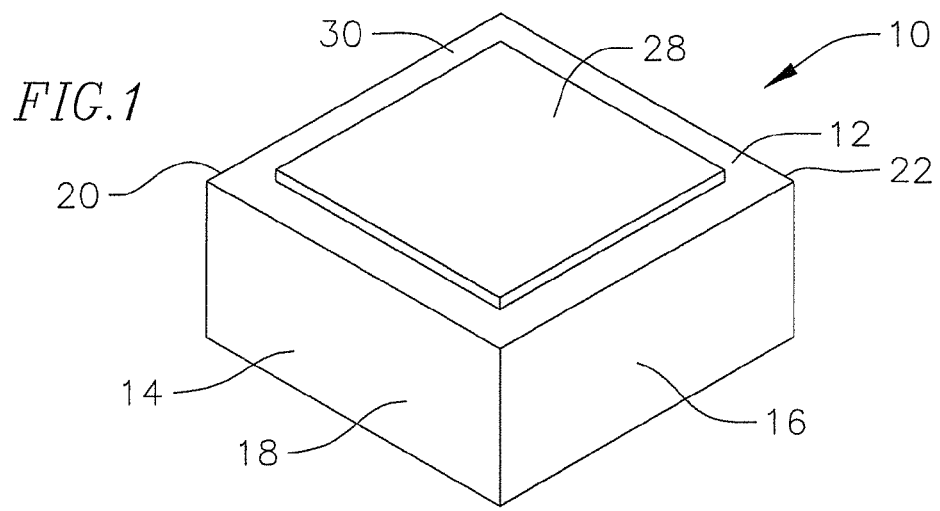
FIG. 1 is a perspective view of a single layer capacitor of the present invention.
Figure 2:
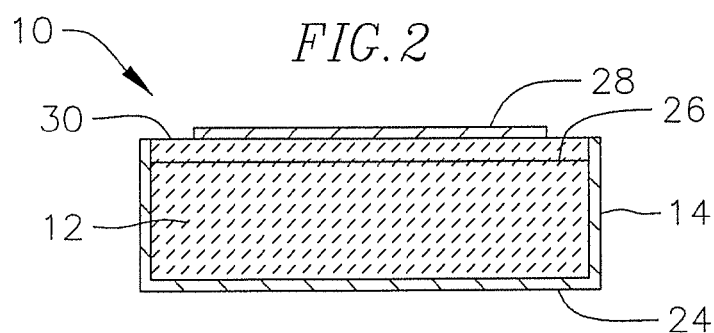
FIG. 2 is a cross-sectional view of the capacitor of FIG. 1.

As shown in FIGS. 1 and 2, the present invention provides a high capacitance surface mountable single layer ceramic capacitor 10 having high structural strength which is easy and inexpensive to manufacture. The capacitor includes a ceramic dielectric layer 12 having a partial or continuous metallization layer 14 applied to all four side surfaces 16, 18, 20, 22 and bottom surface 24. The dielectric layer 12, also referred herein as the ceramic body, includes an internal electrode 26 which extends across an entire width of the ceramic body and is in electrical contact with the metallization layer 14, as shown for example in FIG. 2 on either side 16 and 20. The capacitor further includes a metallization pad 28 positioned on the top surface 30 of the ceramic body 12.

Electrical connections to an external circuit can be made by attaching to the top metallization pad 28 and the bottom metallization layer 14 on the bottom surface 24 or to sides 16, 18, 20 and 22. The capacitance value within the capacitor can be described by the formula $C = eA/d$ where $e$=the permittivity of the dielectric body material, $A$=the area of the top pad 28, and $d$=the distance between the top pad 28 and the electrode 26. Unlike standard single layer capacitors, the distance d can be minimized without compromising structure and strength of the component by the inclusion of the electrode. The distance d is smaller because the positioning of the electrode yet the strength of the capacitor is achieved by having a thickness of material below the electrode.

Figure 3:
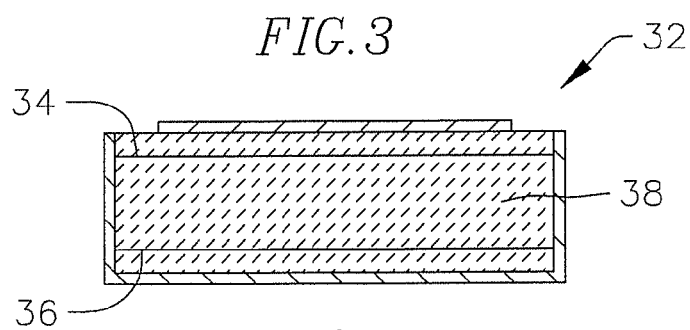
FIG. 3 is a cross-sectional view of an alternative single layer capacitor of the present invention.

Although FIGS. 1 and 2 illustrate a single layer ceramic capacitor having a single electrode 26, multiple electrodes can be incorporated as shown in FIG. 3 wherein capacitor 32 includes two or more electrodes as shown by 34 and 36 positioned within the ceramic dielectric body 38.

The capacitor can be manufactured by using a green ceramic bar, and built upon with one or more internal electrodes by positioning the electrodes in between individual layers of ceramic dielectric material. The ceramic material can be Class 1, 2 or 3 ceramic or any other ceramic deemed suitable for manufacture of multi-layer ceramic capacitors or single layer capacitors. The resulting fired capacitor is a single layer dielectric which is then metallized on all six sides by plating. The top pad 28 is then formed by removing the outer portions of the metallization from the top surface using a laser, mechanical milling or other technique to create the top conductive plate.

Figure 4:
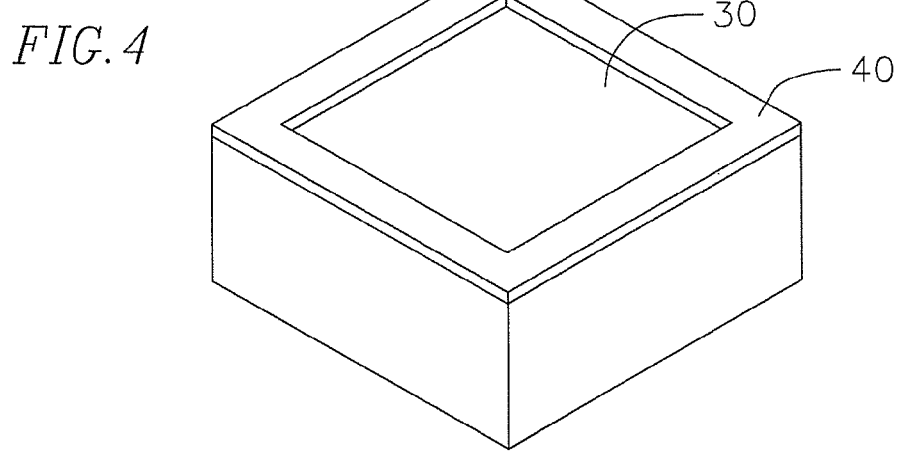
FIG. 4 is a perspective view of another alternative embodiment single layer capacitor of the present invention.

Alternatively, as shown in FIG. 4, prior to metallizing, a passivation surface such as a non-plateable glass or other insulating material 40 can be applied onto the top surface 30. The bar is then cut into discrete components. When the capacitors are metallized, the passivation material creates a gap between the plated sides and the top pad 28. The passivation material creates the gap between the top conductive plate and the bottom metallization that is connected to the internal conductive electrode. FIGS. 1 through 4 illustrate a square capacitor, however, as shown in FIG. 5, a capacitor 42 can be rectangular and can contain a number of top conductive pads 44, 46 and 48. The size of pads 44 through 48 can be the same or different. Utilizing a plurality of conductive pads can create a capacitor array wherein the pad sizes can be altered, or customized so that each capacitor value 50, 52 and 54 can be different as shown in FIG. 7.

FIG. 8 illustrates yet another embodiment single layer capacitor 60 of the present invention. Capacitor 60 is a floating capacitor which is two capacitors in series. Capacitor 60 includes a ceramic body 62 having electrodes 64 and 66 positioned therein similar to FIG. 3. Metallization layer 68 is applied to all four sides of the ceramic body and metallization pad 70 is positioned on the top surface 72 and a metallization pad 74 is position on bottom surface 76 of the ceramic body. Pads 70 and 74 are formed similar to the pads in the other embodiments.

The capacitor of the present invention, for example is not restricted to but can have dimensions ranging from 0.010"× 0.010" to 0.090"×0.090" for square versions and is not restricted to but can have thicknesses ranging from 0.003" to 0.020". Some of the advantages of the present invention include higher capacitance per volume and the ability to use various dielectrics which result is a wide capacitance range. The capacitor eliminates the need for high cost materials and provides the ability to make an array of single layer capacitors of any size and different capacitance values within the same capacitor strip. The capacitor of the present invention further allows the capacitance values to be customized, and the utilization of thin dielectric layers to provide high capacitance values without sacrificing structural strength.

Although the present invention has been described and illustrated with respect to several embodiments thereof, it is to be understood that changes and modifications can be made therein which are within the full intended scope of the invention as hereinafter claimed.

What is claimed is:

1. A high capacitance single layer ceramic capacitor comprising a single layer ceramic dielectric body having at least one internal buried electrode extending across an entire width thereof in electrical contact with a conductive metallization layer positioned on at least a portion of each of the four sides and an entire bottom surface of the single layer ceramic dielectric body, and at least one electrically isolated metallization pad positioned on a top surface of the single layer ceramic dielectric body and electrically isolated from all electrodes inside the single layer ceramic dielectric body,
   wherein the electrically isolated metallization pad is in parallel with a main surface of the internal buried electrode, and formed only on a top surface of the ceramic dielectric body.

2. The capacitor of claim 1, further having two or more electrodes spaced within the single layer ceramic dielectric body.

3. The capacitor of claim 1, wherein there are a plurality of metallization pads electrically isolated from one another on the top surface of the capacitor.

4. The capacitor of claim 3, wherein the metallization pads are different sizes.

5. A high capacitance single layer ceramic capacitor comprising a single layer ceramic dielectric body having at least one internal buried electrode extending across an entire width thereof in electrical contact with a conductive metallization layer positioned on at least a portion of each of the four sides, said capacitor further comprising a metallization layer on an entire bottom surface of the single layer ceramic dielectric body, and at least one electrically isolated metallization pad positioned on a top surface of the single layer ceramic dielectric body and electrically isolated from all electrodes inside the single layer ceramic dielectric body,
   wherein the electrically isolated metallization pad is in parallel with a main surface of the internal buried electrode, and formed only on a top surface of the ceramic dielectric body.

* * * * *